US007249063B2

(12) United States Patent
McMullen et al.

(10) Patent No.: US 7,249,063 B2
(45) Date of Patent: Jul. 24, 2007

(54) METHODS AND SYSTEMS FOR SELLING PRODUCTS IN A HOME IMPROVEMENTS OR COMMERCIAL CONSTRUCTION RETAIL STORE

(75) Inventors: John W. McMullen, Long Beach, CA (US); Norman C. Tracy, Huntington Beach, CA (US)

(73) Assignee: Custom Building Products, Inc., Seal Beach, CA (US)

( * ) Notice: Subject to any disclaimer, the term of this patent is extended or adjusted under 35 U.S.C. 154(b) by 304 days.

(21) Appl. No.: 10/754,155

(22) Filed: Jan. 9, 2004

(65) Prior Publication Data

US 2005/0154650 A1    Jul. 14, 2005

(51) Int. Cl.
*G06Q 30/00* (2006.01)
*G06F 7/00* (2006.01)
(52) U.S. Cl. .......................................... 705/26; 705/27
(58) Field of Classification Search .................. 705/26, 705/27
See application file for complete search history.

(56) References Cited

U.S. PATENT DOCUMENTS

| | | | | |
|---|---|---|---|---|
| 6,820,062 | B1* | 11/2004 | Gupta et al. ................... | 705/16 |
| 6,950,826 | B1* | 9/2005 | Freeman ....................... | 707/102 |
| 2001/0044749 | A1* | 11/2001 | Heisler et al. ................. | 705/26 |
| 2002/0010637 | A1* | 1/2002 | Lieu et al. ..................... | 705/26 |
| 2004/0073492 | A1* | 4/2004 | Griffin .......................... | 705/26 |
| 2005/0038719 | A1* | 2/2005 | Young et al. .................. | 705/28 |
| 2005/0044011 | A1* | 2/2005 | Deal ............................. | 705/27 |
| 2005/0251456 | A1* | 11/2005 | Perkowski .................... | 705/26 |

FOREIGN PATENT DOCUMENTS

CA    2338926 A1 *   9/2001

OTHER PUBLICATIONS

Author unknown, "Home Depot Launches 'Customer-Driven' Internet Strategy With New Web Site," Canada NewsWire, Ottawa, Jun. 30, 1999, p. 1.*
www.lowes.com, archived at web.archive.org and dated Nov. 25, 2002.*
www.Lowes.com, archived at web.archive.org and dated Nov. 25, 2002 (previously supplied).*
Converging Systems—web pages, "Converging Systems Management" information regarding products and profile of company, 12 pages.
Behr Paint Estimator—web page 2 pages regarding stains, varnishes and paints.

* cited by examiner

*Primary Examiner*—Yogesh C. Garg
*Assistant Examiner*—Amee A. Shah
(74) *Attorney, Agent, or Firm*—Fulwider Patton LLP

(57) ABSTRACT

A system and method for merchandising products in a home improvement or commercial construction retail store by providing an enhanced, integrated shopping experience for customers that improves the customer's understanding of a particular home improvement or commercial construction project while introducing the seller's products adapted to perform the home improvement or commercial construction project through coordination of graphic elements such as color or number coding of the seller's products with an interactive display that conveys information regarding the project and aisle merchandising that directs the customer to the seller's products.

43 Claims, 15 Drawing Sheets

SEARCH PRODUCTS BY STEP - PREP

| | Product | When To Use |
|---|---|---|
| | Fiber Cement Backerboard | Tiling over plywood on interior floor or countertops only |
| | 1/2" Backerboard | Tiling over plywood in place of drywall in wet areas; 1/2" ideal for wall or floor installations |
| | 1/4" Backerboard | Tiling over plywood on floors, decks or countertops |
| | T.S.P. | Cleaning surfaces prior to tiling |
| | Patching and Finishing Compound | Patching dips and gaps fast |
| | RS Self-Leveling Underlayment | Leveling uneven surfaces |
| | Latex Primer | Preparing surface for application of |
| | Waterproofing and Anti-Fracture Membrane | Preventing tile from cracking due to minor surface movement |
| | Backerboard Screws | Fastening and other backerboards |

FIG. 4B

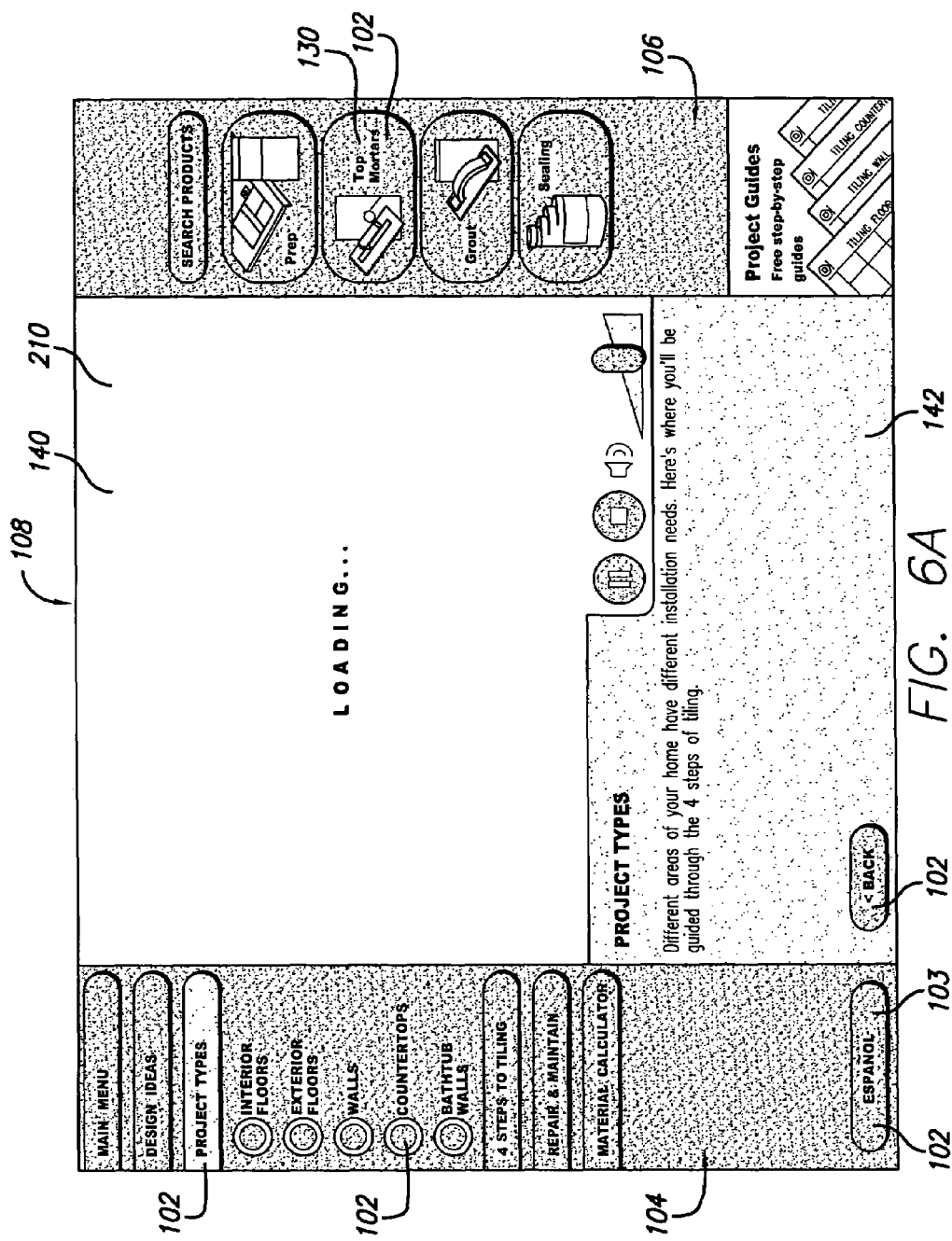

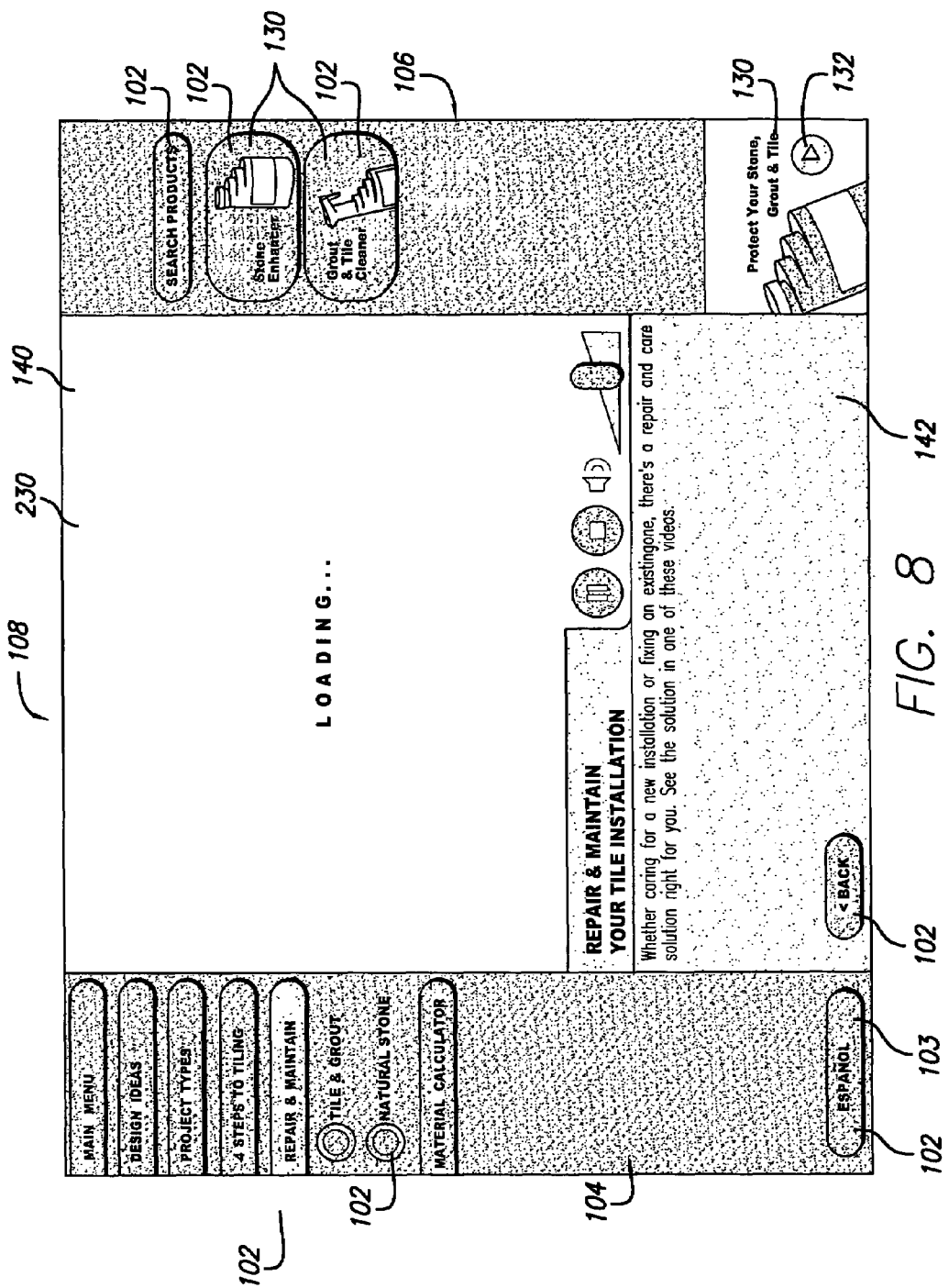

METHODS AND SYSTEMS FOR SELLING PRODUCTS IN A HOME IMPROVEMENTS OR COMMERCIAL CONSTRUCTION RETAIL STORE

BACKGROUND OF THE INVENTION

An ever-increasing number of persons are undertaking "do-it-yourself" home improvement projects that in the past would have been performed by professional contractors, and the number of sellers of products adapted for performing home improvement and commercial construction projects has also increased, and diversified. Amateurs and professionals performing a particular home improvement or commercial construction project are typically likely to receive different and conflicting information concerning a particular brand of product or "product line" from different stores, and even from different personnel in an individual store. It would therefore be advantageous to amateurs and professionals in the home improvement and commercial construction industries to have a reliable source of consistent, expert information concerning product brands that are available, as well as expert advice and instruction concerning methods and techniques for installation and usage of such products. For example, even experienced professionals may have questions concerning specific products or new products and systems for installation, and can benefit from a customized, streamline, interactive expert information system. It would also be desirable to provide such an expert information system that is able to provide enhanced instruction and training for store personnel and staff, to allow stores to provide better educated staff to interact directly and personally with customers.

It is well known to use attractive and distinct packaging and assertive product claims to entice customers to select a seller's product from the shelves of a home improvement retail store. It is also known that the decision to undertake a particular home improvement project may be affected by the amount of information known regarding the particular project. It would therefore also be desirable to provide an integrated merchandising system coordinating point of purchase signage and packaging with an interactive merchandising system, printed project guide materials offering step-by-step instructions, as well as video instruction to attract consumers to the interactive expert information system, and to alert customers to available project guides, expert information, design services, and the like.

Furthermore, if the steps necessary to perform a particular home improvement project can be conveyed in simple language and in a "step-by-step" format, a novice is more likely to decide to undertake that particular home improvement project himself rather than hiring a professional contractor. It is possible that a novice may be convinced to undertake a particular home improvement project which he had not contemplated if information about the necessary steps to performing the project and the available products are conveyed in such a way as to make the project seem simple and uncomplicated. Therefore, it is in a seller's best interests to convey information not only about their particular products, but also information regarding the home improvement project to which the products are directed.

A typical valuable source of information regarding home improvement and construction projects and the products adapted for performing the projects is the in-store personnel. Although the in-store personnel can be trained so that they can convey reliable information regarding a particular project, this method of conveying information has drawbacks.

For instance, it may not be practical to train all in-store personnel to convey information regarding a particular project. Even if a large number of in-store personnel could be trained to convey the information, the quality of information conveyed may vary from employee to employee. Furthermore, a potential customer may not be willing to approach in-store personnel regarding a particular project about which they know little for fear of asking an unintelligent question. Moreover, while in-store personnel may be trained to convey information, they or the retail store may be reluctant to appear to endorse a particular seller's product. It would therefore be desirable to provide an expert information system for use in an integrated merchandising system to augment customer support.

It would be desirable to provide, a user-friendly system and method for conveying information regarding a particular project to potential customers in a retail store, the information conveyed being consistently reliable information about the project and a seller's products adapted to perform the project and the information conveyed in a manner consistent with the level of the individual customer's knowledge. The present invention addresses these and other needs.

INVENTION SUMMARY

Briefly and in general terms, the present invention is embodied in a system and method for selling products in a store for home improvement or commercial construction projects, and the like. Specifically, the system and method provide an enhanced, integrated shopping experience for customers in such a store by improving the customer's understanding of a particular project and the seller's products adapted to perform the project, through coordination of graphic elements, such as color or number coding of the seller's products, with an interactive display that conveys information regarding the project and aisle merchandising that directs the customer to the seller's products.

In one aspect of the invention, a system is provided for a store selling products adapted to perform various phases of a home improvement or commercial construction project. The system coordinates an interactive display for conveying information to the user (i.e. potential customer) with the visual display of the seller's products on the shelves of the retail store such that the information conveyed to the user has both educational and advertisement content that allows the user to gain knowledge related to performing the user's project while encouraging the user to select the seller's products adapted to perform the project.

The interactive display is adapted to provide information at the user's request, the information including general information regarding the different options available for a particular project, instructional information such as how to perform the phases of the project, and specific information regarding the seller's products adapted to perform the phases of the project. A user who is a novice in performing a particular project would be able to access general information as part of the decision to undertake the project and then, after deciding to undertake the project, access specific information regarding performing each phase of the project and the seller's products adapted to perform them. On the other hand, a user who has already decided to undertake the home improvement project and who has some basic knowledge of the phases required to perform the project would be able to access specific information regarding how to perform the phases of the project or the seller's products adapted to perform the phases, thereby bypassing more general information.

By allowing the user to determine which information is conveyed, the system avoids unnecessary repetition of information and avoids alienating the knowledgeable user while allowing a novice user to access as much information as he or she deems necessary in an environment that is not intimidating. The system, therefore, is adaptable to the level of information a particular user desires.

A user who considers himself or herself fairly knowledgeable will be able to access the specific information desired and, if they desire to "double-check" their level of expertise, still be able to access general information. The novice user, who may be unsure about undertaking a particular home improvement or construction project, or who may be intimidated by approaching in-store personnel to ask questions, may access general information and determine that they are capable of undertaking the project. Once convinced to undertake the project, such a user is more likely to continue to access specific information regarding performing the phases of the project and ultimately select the seller's products.

It is contemplated that the information conveyed may be provided in more than one language, thereby enabling the user to further tailor the information to his or her specific needs. The integrated merchandising system also provides an expert information system that can be used to train in-store personnel regarding product brands and installation and construction techniques, to provide consistent customer support. The expert information system also provides video instruction for training and attracting consumers to the expert information system, and to alert customers to available project guides, products, design services, and the like. It is further contemplated that the expert information system is provided in an interactive display that may be adapted for estimating the quantities of the seller's products necessary to perform a home improvement or commercial construction project, based on information provided by the user. The ability to track usage of the interactive display is also contemplated, thereby providing information which may be utilized to "fine tune" the information conveyed based on the needs of users.

In one preferred aspect, the interactive display is contained in a kiosk that is located in the retail store with the seller's products arranged on the shelves of the retail store in close proximity to the kiosk. Although, in the preferred embodiment, the user accesses the interactive display via a keyboard or touch screen located in the kiosk, it is contemplated that the interactive display may be accessed via the Internet from a home computer. It is further contemplated that a printer may provide a hard copy of the information accessed from the interactive display, thereby allowing the user to obtain detailed instructions for performing the phases of the project, or a "shopping list" of the seller's products, adapted to perform the project.

The seller's products adapted to be used in various phases of performing the home improvement or commercial construction project are arranged on the shelves of the retail store and grouped according to the phases of the project to which they are adapted. The seller's products have indicia, such as color or number coding, to facilitate identifying the seller's products with the corresponding phase of the project. The indicia preferably also allow the seller's products to be easily differentiated from competitors products such that the indicia relate all the seller's products to each other while at the same time differentiating the seller's products corresponding to a particular phase of the project from the seller's products corresponding to the other phases of the project. In a preferred embodiment, the seller's products include both the material and tools necessary to perform all phases of the home improvement project from inception to completion.

The information conveyed by the interactive display is coordinated with the grouping of the seller's products on the shelves of the retail store and the indicia in order to facilitate selection of the seller's products for each of the phases of the home improvement or commercial construction project. The overall effect of this coordination is intended to both educate the user in a particular home improvement or commercial construction project and to encourage him or her to select the seller's products adapted to perform the project.

Although it is contemplated that the information conveyed by the interactive display may direct the user to the location of the seller's products on the shelves of the retail store, a more subtle synergistic effect of the coordination between the information conveyed and the selection of the seller's products is contemplated.

The interactive display, the enclosure in which the interactive display is contained, the visual information provided by the interactive display and the indicia and the arrangement of the seller's products on the shelves of the retail store are intended to be user-friendly and to have a "look and feel" that assist the user in undertaking the home improvement or commercial construction project, and in selecting the seller's products to perform the phases of the project. Toward this end, tracking the usage of the interactive display may provide information that facilitates subsequent modifications to the information conveyed by the interactive display, the ways in which the information is conveyed or the way in which the seller's products are grouped on the shelves of the retail store and the indicia used to differentiate the seller's products.

In another aspect of the invention, a method is provided for a visual display of products in a home improvement or commercial construction retail store using the system of the present invention. By using the interactive display to convey information that is coordinated with the arrangement of the seller's products on the shelves of the retail store and the indicia identifying the seller's products, a user-friendly environment is created that not only encourages the user to undertake the home improvement or commercial construction project, but also to select the seller's products to perform the phases of the project.

Although the system and method of the present invention are illustrated as being directed to a tile or stone home improvement or commercial construction project, it is contemplated that the present invention may be applied to any home improvement or commercial construction project for which distinct phases of the project may be identified and for which a seller's products are adapted for use in the performance of those phases.

Other features and advantages of the present invention will become apparent from the following detailed description taken in conjunction with the accompanying drawings, which illustrate, by way of example, the principles of the invention.

BRIEF DESCRIPTION OF THE DRAWINGS

FIG. 4B is a perspective view of one embodiment of the products list screen of the present invention which lists the seller's products corresponding to the search initiated from the screen illustrated in FIG. 4A.

FIG. 6A is a perspective view of one embodiment of the project types screen of the present invention.

FIG. 8 is a perspective view of one embodiment of the repair and maintain screen of the present invention.

DETAILED DESCRIPTION OF THE PREFERRED EMBODIMENTS

The present invention relates to a system and method for selling products in a home improvement or commercial construction retail store.

Figure 1:
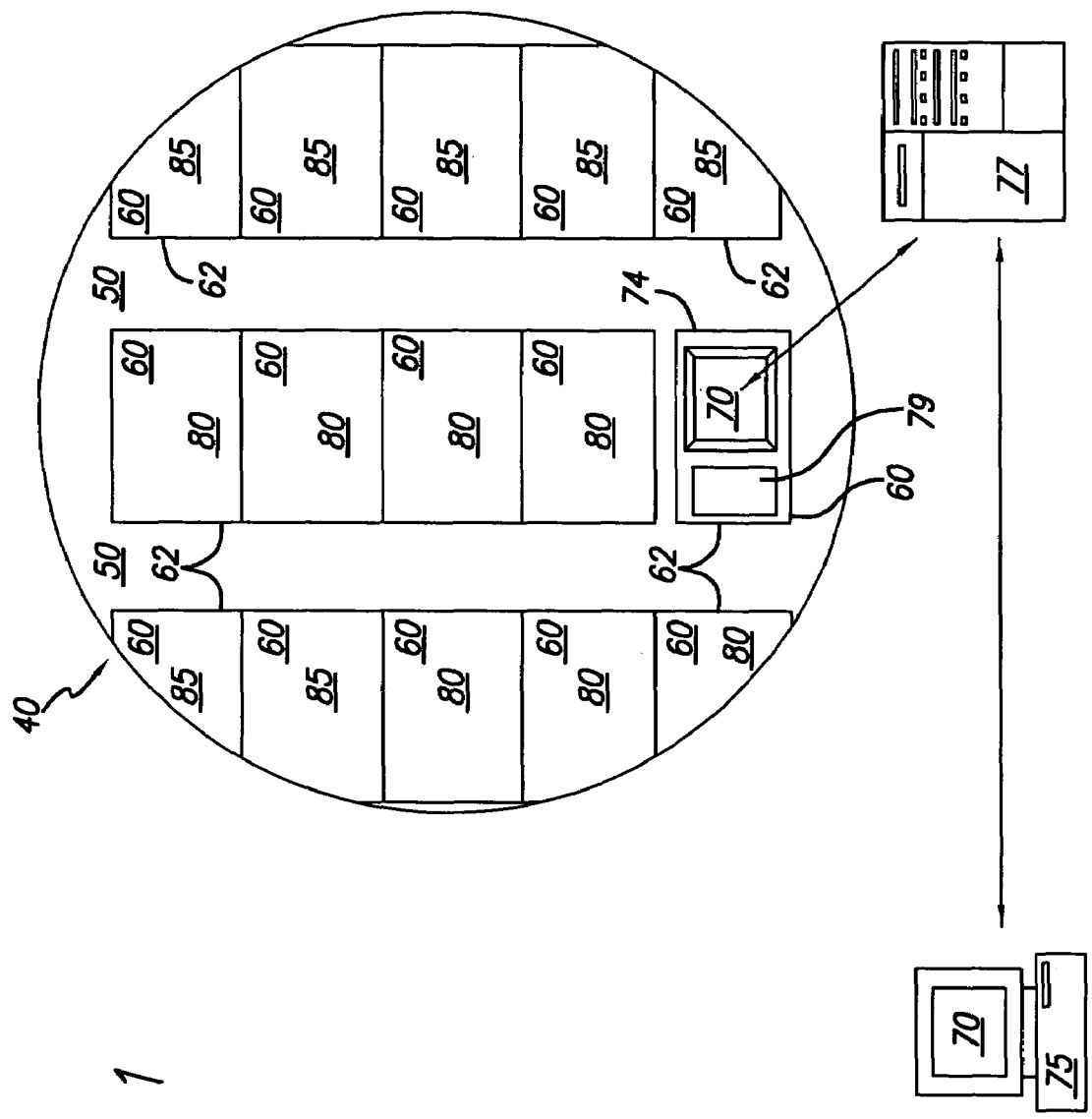
FIG. 1 is a partial schematic view of the system of the present invention.

Referring to FIG. 1, the system of the present invention is shown integrated into a typical home improvement or commercial construction retail store 40 having aisles 50 separated by rows of bays 60. Each bay is typically segmented into two or more shelves on which products are displayed.

An interactive display 70 is located in one of the bays 60, preferably one of the end bays 62. The enclosure 74 in which the interactive display is located replaces the shelves in that bay. The seller's products 80 are adapted to perform various phases of a home improvement or commercial construction project and are arranged on the shelves of the bays, preferably in close proximity to the bay in which the interactive display is located. Alternately, the interactive display can be provided in a suitable stand-alone kiosk located in or in close proximity to the store 40.

In another embodiment, the interactive display can be a home computer 75 accessing a server 77 providing the interactive screens via the Internet, as will be further explained below. In a preferred embodiment, seller's products are provided which are adapted to perform every phase of the project from inception to completion.

The interactive display 70 conveys information regarding the home improvement or commercial construction project when commanded by a user. The information conveyed may range from general information, such as the different options available for the project, to specific information, such as instructional information regarding the phases of performing the project or seller's products 80 adapted to perform the phases. It is contemplated that a printer 79 may be provided, preferably in the enclosure in which the interactive display is located, to allow the user to obtain a hard copy of information conveyed by the interactive display.

Figure 2:
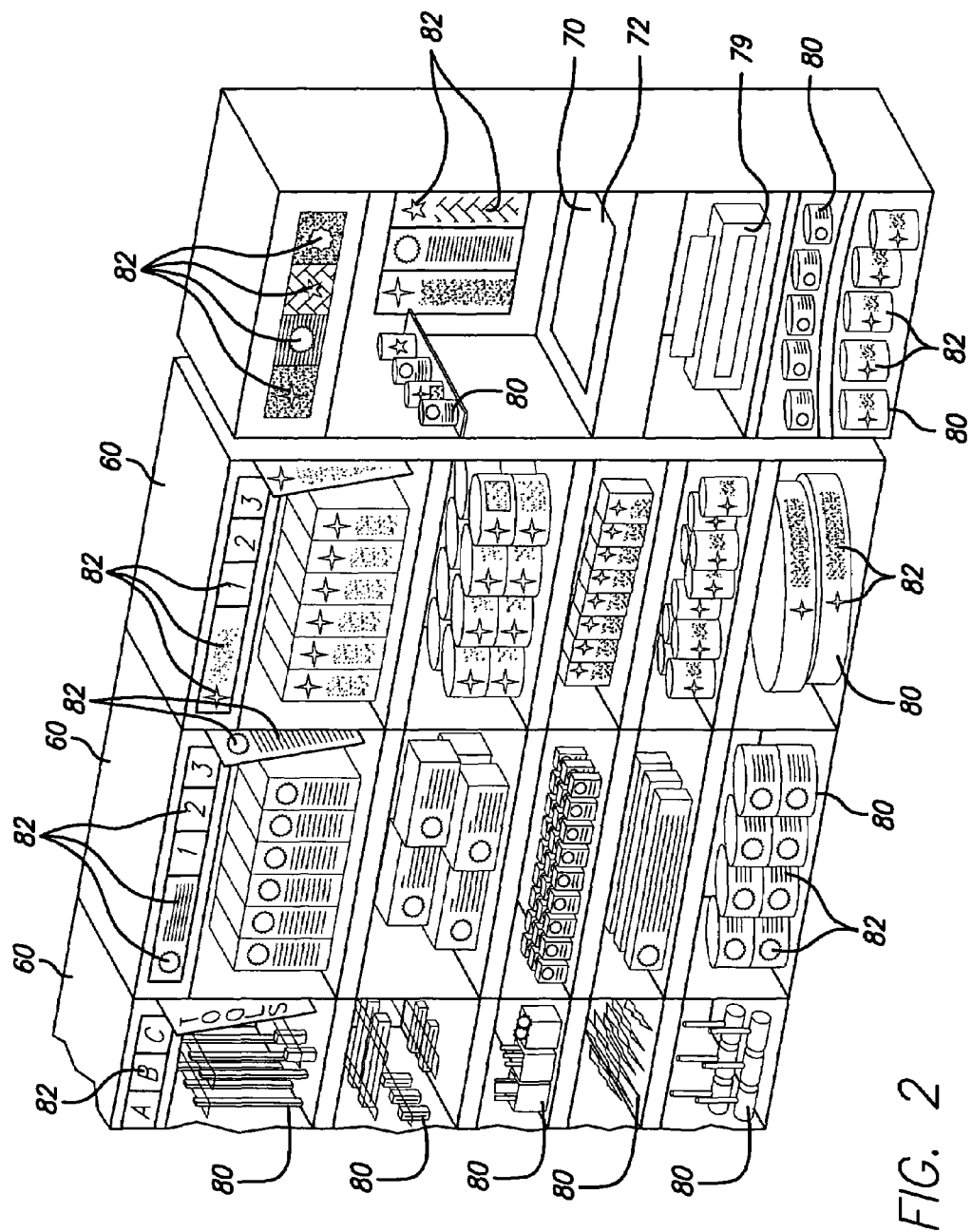
FIG. 2 is a perspective view of one embodiment of the present invention showing the seller's products arranged in the bays on the aisle of a home improvement or commercial construction retail store.

Referring to FIG. 2, one embodiment of the system is illustrated. The seller's products 80 are arranged on the shelves of the bays 60 according to the phase of the home improvement or commercial construction project for which they are adapted. The products have indicia 82 identifying the products that are adapted to perform each phase and differentiating those products from the seller's products adapted to perform other phases. At the same time, the indicia differentiates the seller's products from the products 85 provided by competitors. The information conveyed by the interactive display 70 is coordinated with the arrangement of the seller's products and the identifying indicia such that selection of the seller' products by the user of the interactive display is facilitated.

In the embodiment illustrated in FIG. 2, the enclosure 74 in which the interactive display 70 is located is a stand-alone kiosk that replaces one of the bays 60. The enclosure contains a keyboard, keypad or touch screen 72 which allows the user to select the information he or she wishes to receive from the interactive display as well as a printer 79 that allows the user to obtain a hard copy of information conveyed by the interactive display. Some of the seller's products 80 as well as examples of identifying indicia 82 may be located in the enclosure in order to further coordinate the information conveyed by the interactive display with the identifying indicia of the seller's products arranged on the shelves.

It is contemplated that the identifying indicia 82 may include color-coding, number coding, visual representations such as shapes or designs, or a combination thereof. It is further contemplated that project guides including written material (not shown) may be provided in the enclosure 74. The written material may have the same identifying indicia as the seller's products arranged on the shelves. The written material may supplement the information conveyed by the interactive display or may provide information not available from the interactive display.

With further reference to FIG. 2, the seller's products 80 are arranged according to the phase of the home improvement or commercial construction project for which they are adapted, preferably with the products adapted for different phases of the project in different bays 60. For example, for a tile and stone home improvement or commercial construction project, the seller's products adapted to perform the phases of surface preparation, setting the tile or stone, grouting, and care and maintenance of the tile or stone may be located in different bays, with all the products related to a particular phase grouped together. Furthermore, a separate bay may contain the seller's tools adapted to perform the phases of the project. It is contemplated that written material, either similar to or different from the written material provided in the enclosure 74, may be provided in the bays in which the seller's products are located.

The identifying indicia 82 on the seller's products and the identifying indicia on the bays in which those products are arranged are consistent in "look and feel" with the information conveyed by the interactive display 70 and the printed material such that the user may easily locate and identify the seller's products. At the same time, the identifying indicia on the seller's products adapted to perform a particular phase of the home improvement or commercial construction project and the identifying indicia on the bays in which those products are arranged are sufficiently different from the identifying indicia on the products adapted to perform other phases of the project and the identifying indicia on the bays in which those products are arranged such that the user may easily locate and identify the seller's products adapted to perform a particular phase of the project.

Referring to FIGS. 3-9, one embodiment of the interactive display 70 screens is illustrated. In the embodiment shown, the interactive display provides information specifically for tile and stone installation, but it is contemplated that a system could be provided for any type of home improvement or commercial construction project for which specific phases may be identified and for which a seller provides products adapted to perform those phases.

Figure 3:
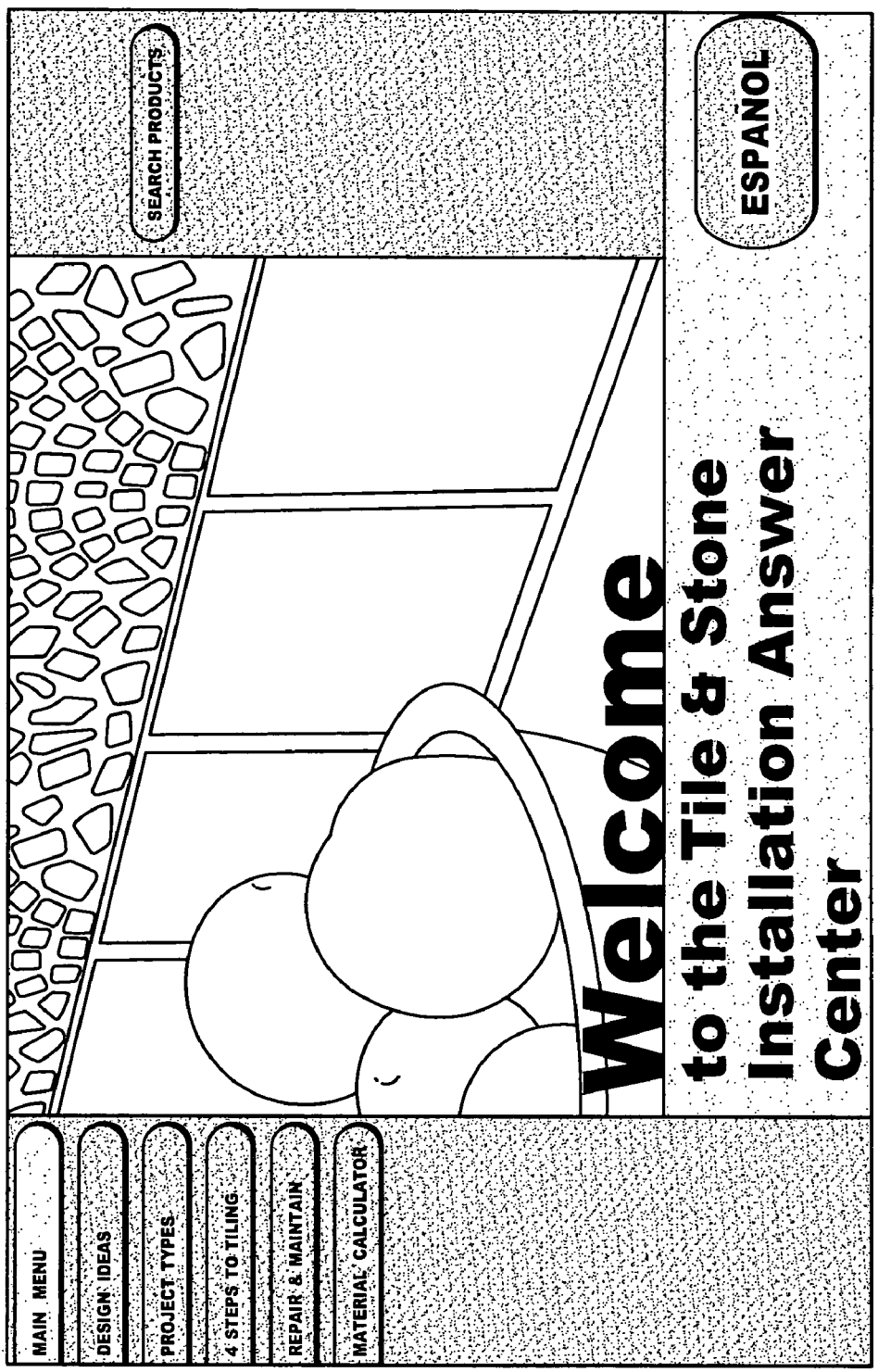
FIG. 3 is a perspective view of one embodiment of the "welcome" screen displayed by the interactive display of the present invention.

Referring to FIG. 3, the initial or "welcome" screen 100 is illustrated. The "welcome" screen is displayed when a user first approaches the interactive display 70. In the embodiment illustrated a screen having touch sensitive buttons 102 is utilized to allow a user to select the information he or she desires to receive.

The screens displayed on the interactive display 70 are divided into a project selection area 104, a seller product advertisement area 106 and an information display area 108. These areas and the corresponding touch sensitive buttons 102 are provided on all screens displayed, thereby allowing the user to maneuver through the various screens in any order he or she desires.

One or more language buttons 103 may be provided enabling the user to select the language in which information is displayed. The language buttons as well as a "BACK" button will be displayed on every successive screen displayed by the interactive display, thereby allowing the user to select the language in which information is displayed or return to the previously displayed screen at any time. It is contemplated that the languages from which a user may select to receive information may be varied to meet the needs of the community in which the system is utilized.

The touch sensitive buttons 102 in the project selection area 104 allow the user to select the type of information desired about a particular home improvement or commercial construction project. The user may return to the initial screen 100 by touching the "MAIN MENU" button at anytime.

Figure 4A:
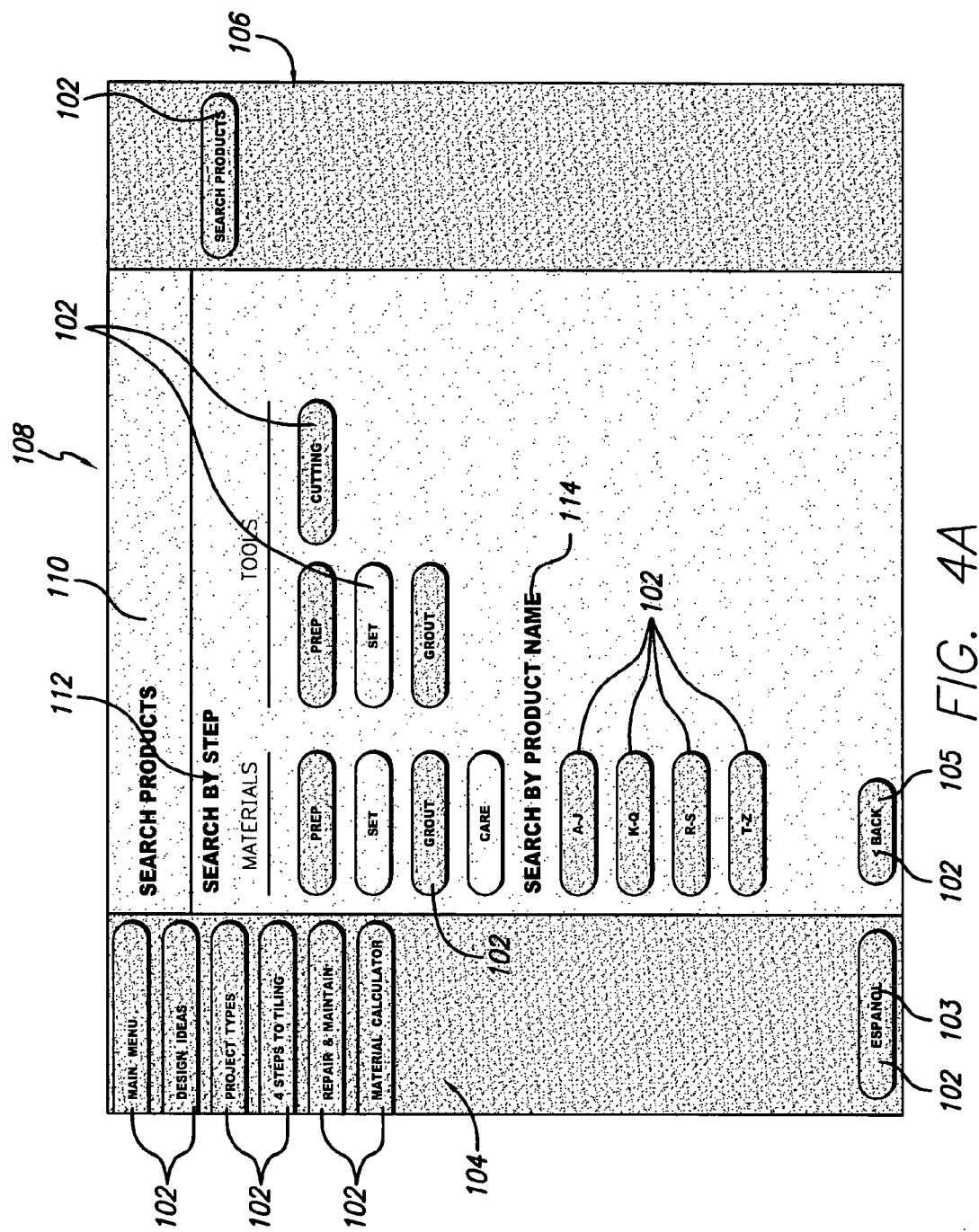
FIG. 4A is a perspective view of one embodiment of the products search screen of the present invention which allows a user to search for the seller's products.

Touching the "SEARCH PRODUCTS" button in the seller product advertisement area 106 at any time displays the products search screen 110 as illustrated in FIG. 4A. This screen allows the user to view information regarding the seller's products 80 that are adapted to perform the phases of a tile and stone home improvement or commercial construction project by making additional choices regarding how he or she desires to search for products.

The user may choose to search for the seller's materials or tools adapted to perform any of the various phases of a tile and stone home improvement or commercial construction project by touching one of the buttons in the step search area 112. On the other hand, a user who has already gained some knowledge of the home improvement project may touch one of the buttons in the name search area 114 to search for a seller's product from an alphabetized list of product types, for example adhesive, gloves or grout.

Once the user selects a search method, for example by touching the "PREP" button in the step search area 112 of the products search screen 110 to search for seller's products 80 adapted for performing the phase of preparing the area to be tiled, a product list screen 115 is displayed, as illustrated in FIG. 4B. The products list screen lists 116 the applicable seller's products adapted for preparing the area to be tiled and provides information regarding each product 118 and a visual representation 122 of the product showing the identifying indicia 82.

Additional touch sensitive buttons 120 are provided on the product list screen 115 which allow the user to search for additional seller's products 80, for example tools, that are related to using the listed 116 seller's products. Touching the "PREP TOOLS" button, the "LAYOUT TOOLS" button or the "CUTTING TOOLS" button will display a similar product list screen with additional seller's products and information about them. Furthermore, touching the "SURFACE PREP" button will return the user to the previous screen displayed.

The additional touch sensitive buttons 120 that are provided on the product list screen 115 may vary based on the phase of the home improvement project selected by the user. For example, the additional buttons provided may be different if the user touches the "SET" button in the step search area 112 of the products search screen 110 to search for seller's products 80 adapted for performing the phase of setting tiles. The seller's products related to setting tile may be different than the seller's products related to preparing the area to be tiled.

If the user touches the "A-J" button, the "K-Q" button, the "R-S" button or the "Y-Z" button in the name search area 114 of the product search screen 110, the user will be presented with an alphabetized type screen (not shown). The alphabetized type screen has additional touch sensitive buttons corresponding to an alphabetized listing of the seller's products of the type whose first letter is in the selected range. For example, buttons corresponding to adhesive, gloves and grout may be among the products listed if the "A-J" button is touched.

Once the user selects a product type by pressing one of the buttons on the alphabetized type screen, a product list screen 115 is displayed showing the seller's products of the selected type. The alphabetized type screen will retain the "A-J" button, the "K-Q" button, the "R-S" button and the "Y-Z" button to enable the user to change his selection and view a different alphabetized type screen containing touch sensitive buttons related to a different alphabetized range of product types.

The seller product advertisement area 106 may also contain visual representations 130 of the seller's products 80 (see FIG. 8). The products depicted in the visual representations may be related to the information displayed in the information display area 108, for example a seller's products related to the care of tile and stone when the user has touched the "REPAIR AND MAINTAIN" button from the "welcome" screen 100 to view information related to the care and maintenance of tile or stone.

A product 80 may be depicted on a touch sensitive button 102 or a separate "link to product" button 132 may be provided, the button enabling the user to obtain the corresponding product list screen 115 for the depicted product without having to touch the "SEARCH PRODUCT" button and perform a step search 112 or name search 114 from the products search screen 110.

Figure 5A:
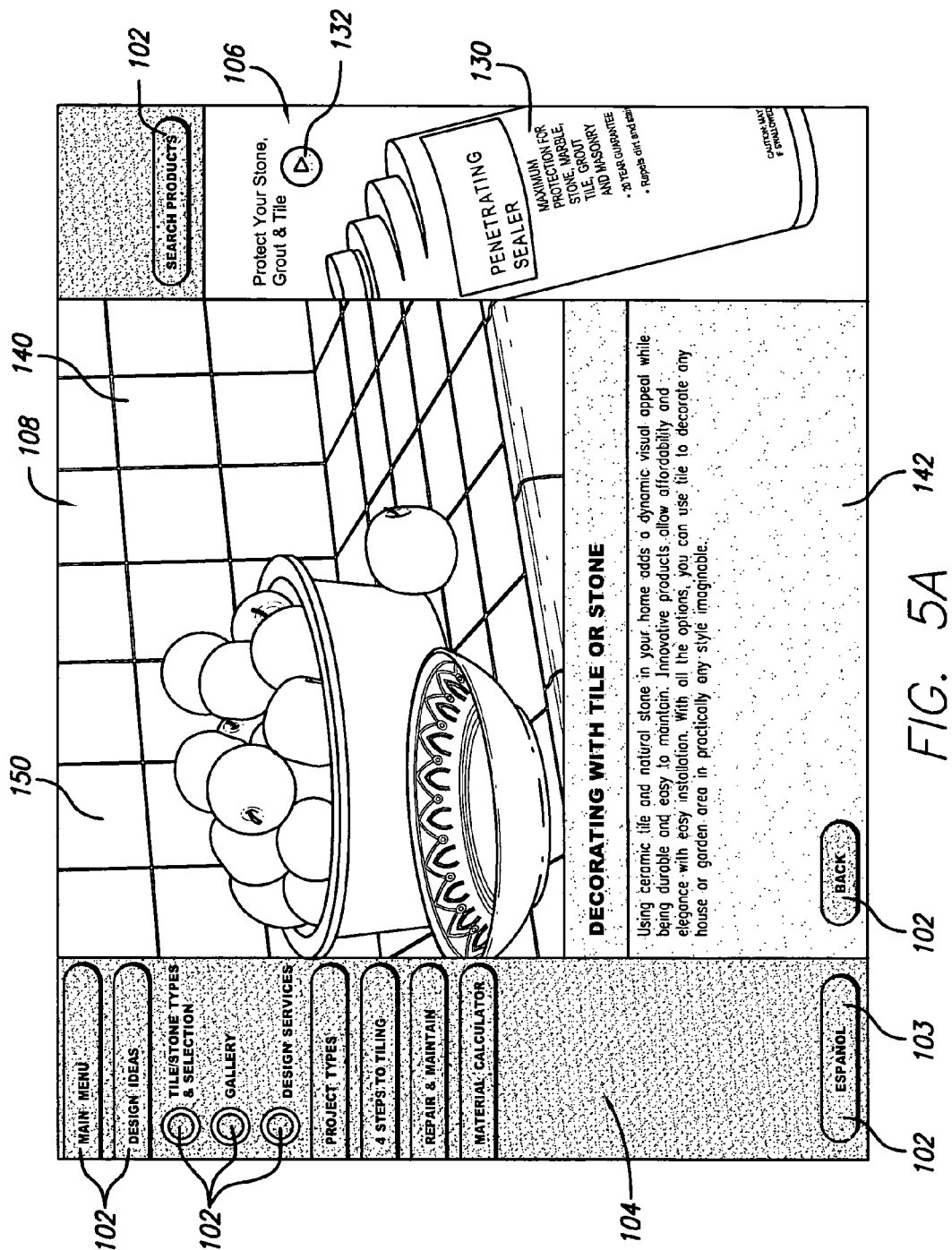
FIG. 5A is a perspective view of one embodiment of the design ideas screen of the present invention.

The information display area 108 includes a visual depiction area 140 and textual depiction area 142 (see FIG. 5A). Information is conveyed to the user in the visual depiction area as a still frame, slide presentation or video clip. Information is conveyed to the user in the textual depiction area in text format.

If information in the visual depiction area 140 is conveyed as a still frame, the user is provided with a single image related to the topic selected by the user. For example, if the user touched the "DESIGN IDEAS" button 102 on the initial screen 100, an image depicting a tile countertop may be displayed (see FIG. 5A) as an example of one type of home improvement project the user may wish to undertake.

If information in the visual depiction area 140 is conveyed as a slide presentation, the user is provided with multiple images related to the topic selected by the user. For example, if the user touched the "TILE/STONE TYPES & SELECTION" button on the design ideas screen 150, multiple images depicting different types of tile such as ceramic, porcelain, natural stone and saltillo may be displayed (see FIG. 5B). The images may sequence from beginning to end automatically or touch sensitive buttons (not shown) may be provided to enable the user to manually sequence forward and backward through the images.

If information in the visual depiction area 140 is conveyed as a video clip, the user is provided with a short video clip, preferable lasting a few minutes or less, related to the topic selected by the user. For example, if the user touched the "LEVEL CONCRETE" button on the interior floors project type screen 160, a short video clip depicting the surface preparation steps necessary to prepare an unlevel concrete surface for tiling may be displayed (see FIG. 6B). Additional video control buttons 170 are provided to enable the user to pause, stop and adjust the volume of the video clip displayed.

The information conveyed in the textual depiction area 142 is intended to supplement the information conveyed in the visual depiction area 140 and may provide further instructions to the user regarding available screen options. For example, the text displayed on the interior floors project type screen 160 may instruct the user to indicate the type of interior surface to be tiled by touching the "BOARD/PLYWOOD" button, the "LEVEL CONCRETE" button, the "UNLEVEL CONCRETE" button, or the "VINYL" button (see FIG. 6B).

The information conveyed in the product advertisement area 106 and the information display area 108 is coordinated to further the connection between the home improvement project and the seller's products 80 adapted to perform the phases of the project. In addition to the visual depictions and direct links via touch sensitive buttons 102, 132, to the seller's products in the product advertisement area, the seller's products may be displayed in the still images, slide show images and video clip images presented in the information display area 140. For example, if the user touches the "SET" button on the tiling steps screen 220 to receive information regarding the steps that must be performed to set tiles, a video clip may be shown which illustrates tiles sold by the seller being set using adhesive sold by the seller and a package of the seller's adhesive with the identifying indicia prominently displayed (see FIG. 7).

The information conveyed is intended to educate the user regarding the home improvement project while establishing a connection between the phases of performing the project and the seller's products adapted to perform the phases. While the user receives educational information, he or she is also acclimated to the "tone and feel" of the identifying indicia 82 that is used on the labels of the seller's products 80 and on the bays 60 of the retail store.

Referring to FIGS. 5-9, some of the screens that may be displayed when the user selects one of the options in the project selection area 104 of the interactive display 70 are illustrated. The user may choose to receive general information regarding tile and stone home improvement or commercial construction projects by touching the "DESIGN IDEAS" button at anytime. The user may choose to receive information regarding specific types of tile and stone applications by touching the "PROJECT TYPES" button at anytime. The user may choose to receive information regarding the phases of performing a specific type of tile or stone tiling project by touching the "4 STEPS TO TILING" button at anytime. The user may choose to receive information regarding the estimated quantities of the seller's products adapted to perform the various phases of a specific type of tile or stone tiling project by touching the "MATERIAL CALCULATOR" button at anytime.

Referring to FIGS. 5A-5D, some of the screens that may be displayed when the user touches the "DESIGN IDEAS" touch sensitive button 102 in the project selection area 104 of the interactive display 70 are illustrated. Upon touching the "DESIGN IDEAS" button, the design ideas screen 150 is displayed as illustrated in FIG. 5A. The user is then given the option of selecting whether he or she wishes to view information regarding various tile and stone types available from the seller by touching the "TILE/STONE TYPES & SELECTION" button or information regarding tiling projects in various areas of a home by touching the "GALLERY" button. The user may also be given the option of viewing information regarding services provided by the retail store such as for planning and installation of tiling projects by touching the "DESIGN SERVICES" button.

Figure 5B:
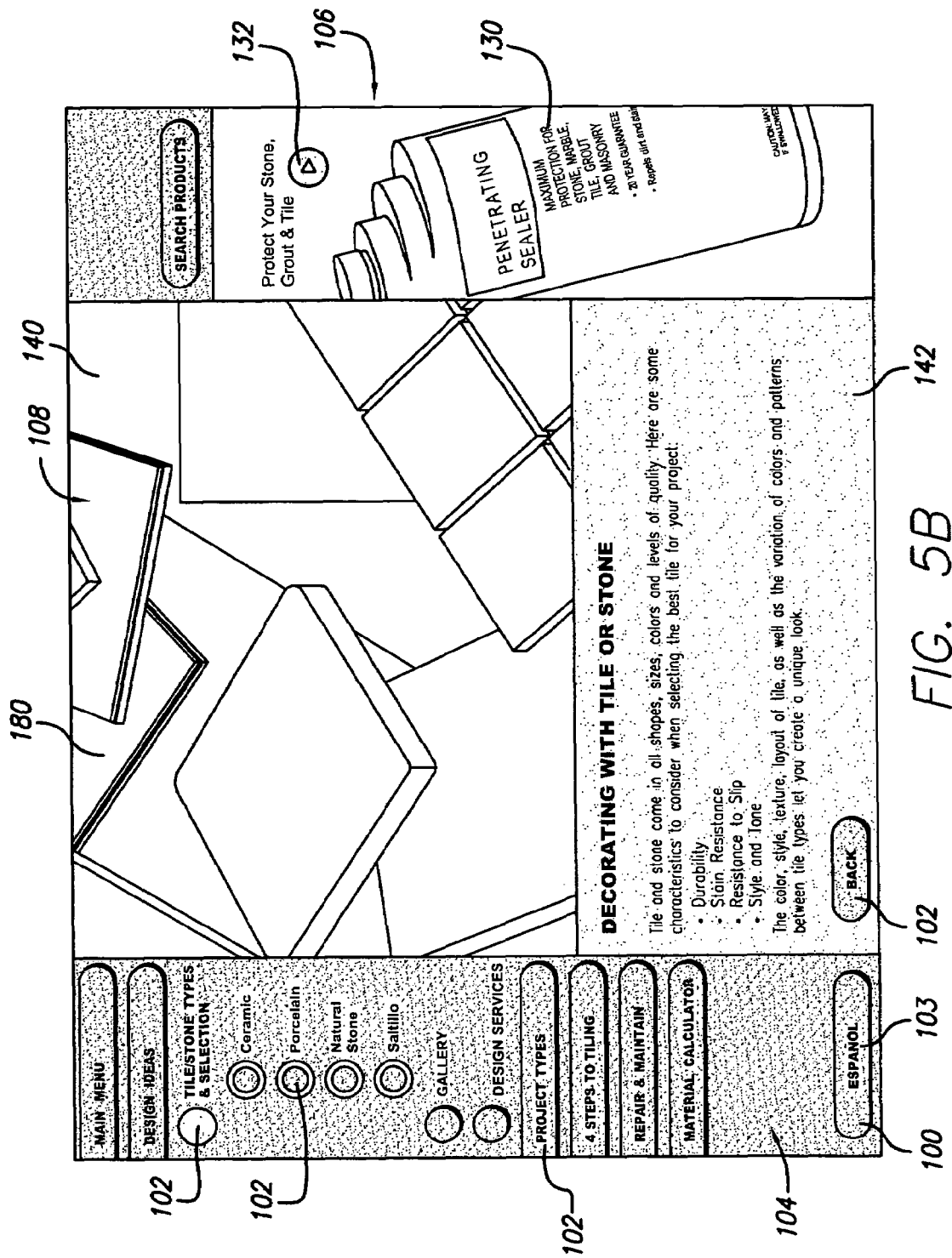
FIG. 5B is a perspective view of one embodiment of the tile and stone types screen displayed if the user elects to view information regarding the available types of tile from the design ideas screen illustrated in FIG. 5A.

If the user touches the "TILE/STONE TYPES & SELECTION" button on the design ideas screen 150, the tile and stone types screen 180 is displayed as illustrated in FIG. 5B. Slide show images illustrating the various types of tile and stone available from the seller are presented in the information display area 108 and textual information regarding some characteristics the user may consider in selecting the right tile for his or her home improvement or commercial construction project is presented in the textual depiction area 142.

The user is given the option to view specific information regarding the particular types of tile available from the seller by touching the "Ceramic" button, "Porcelain" button, "Natural Stone" button or "Saltillo" button. Upon selecting a type of tile, additional slide show images and textual information will be presented regarding the selected tile type available from the seller.

Figure 5C:
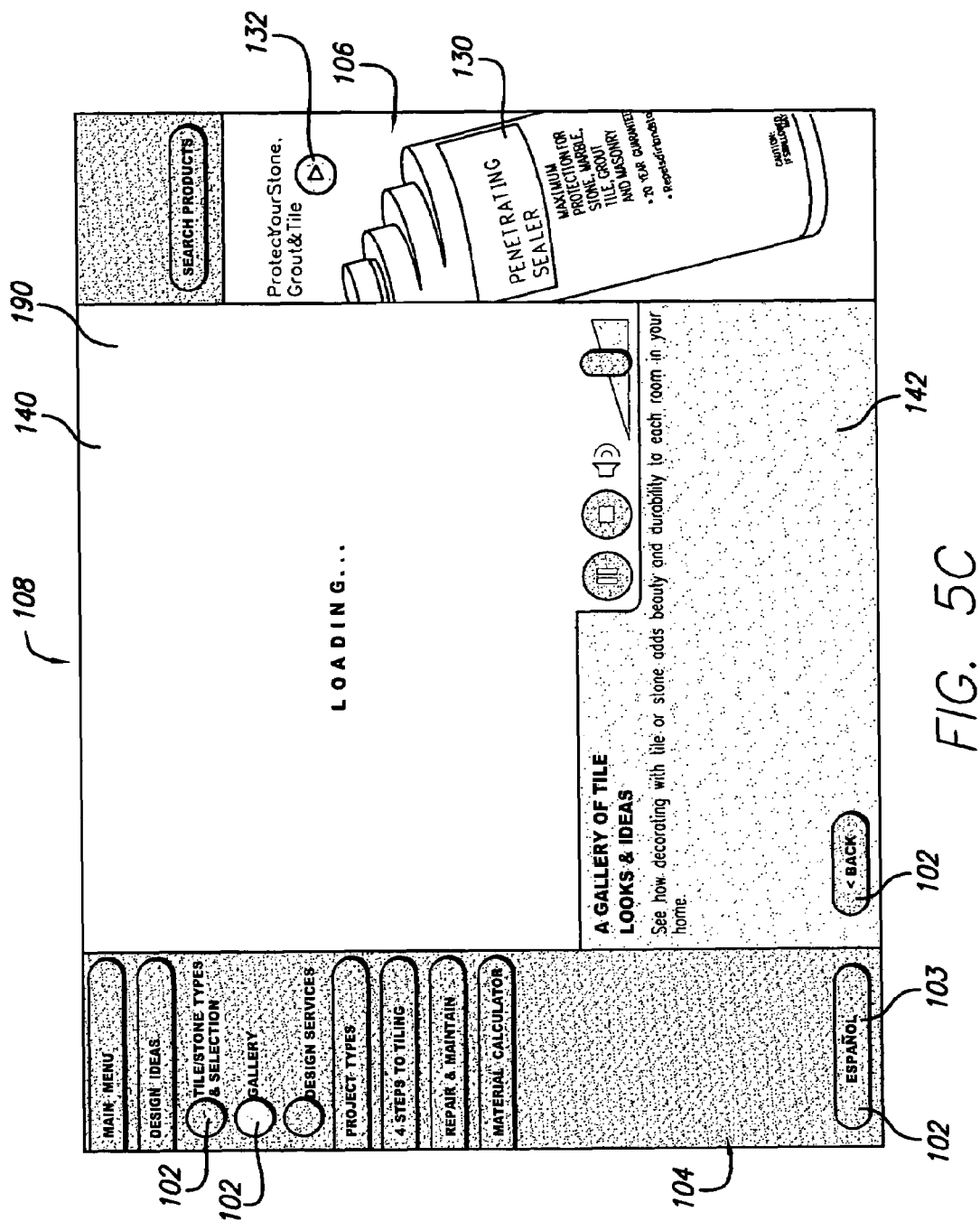
FIG. 5C is a perspective view of one embodiment of the gallery screen displayed if the user elects to view information regarding various uses of tile in a home from the design ideas screen illustrated in FIG. 5A.

If the user touches the "GALLERY" button on the design ideas screen 150, the gallery screen 190 is displayed as illustrated in FIG. 5C. A video clip illustrating completed tiling projects in various areas is presented in the information display area 108 and textual information regarding the benefits of decorating with tile or stone is presented in the textual depiction area 142. The completed projects illustrated in the video clip may depict tile and stone available from the seller.

Figure 5D:
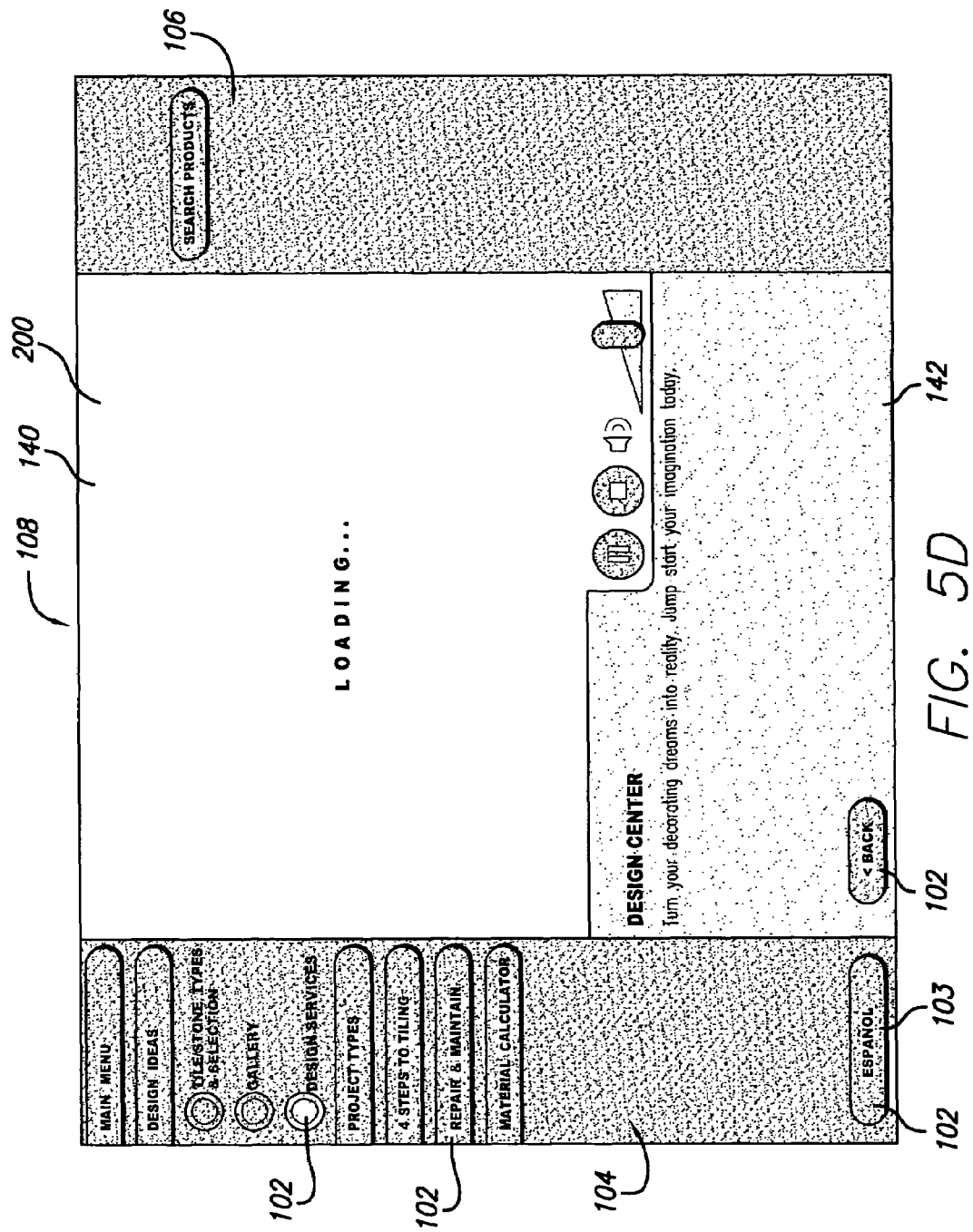
FIG. 5D is a perspective view of one embodiment of the design services screen displayed if the user elects to view information regarding available in-store design services from the design ideas screen illustrated in FIG. 5A.

If the user touches the "DESIGN SERVICES" button on the design ideas screen 150, the design services screen 200 is displayed as illustrated in FIG. 5D. A video clip illustrating various services related to tiling projects that are available from in-store personnel is presented in the information display area 108 and textual information regarding the benefits of utilizing the in-store services is presented in the textual depiction area 142. The video clip may depict products 80 available from the seller being utilized by in-store personnel.

Figure 6B:
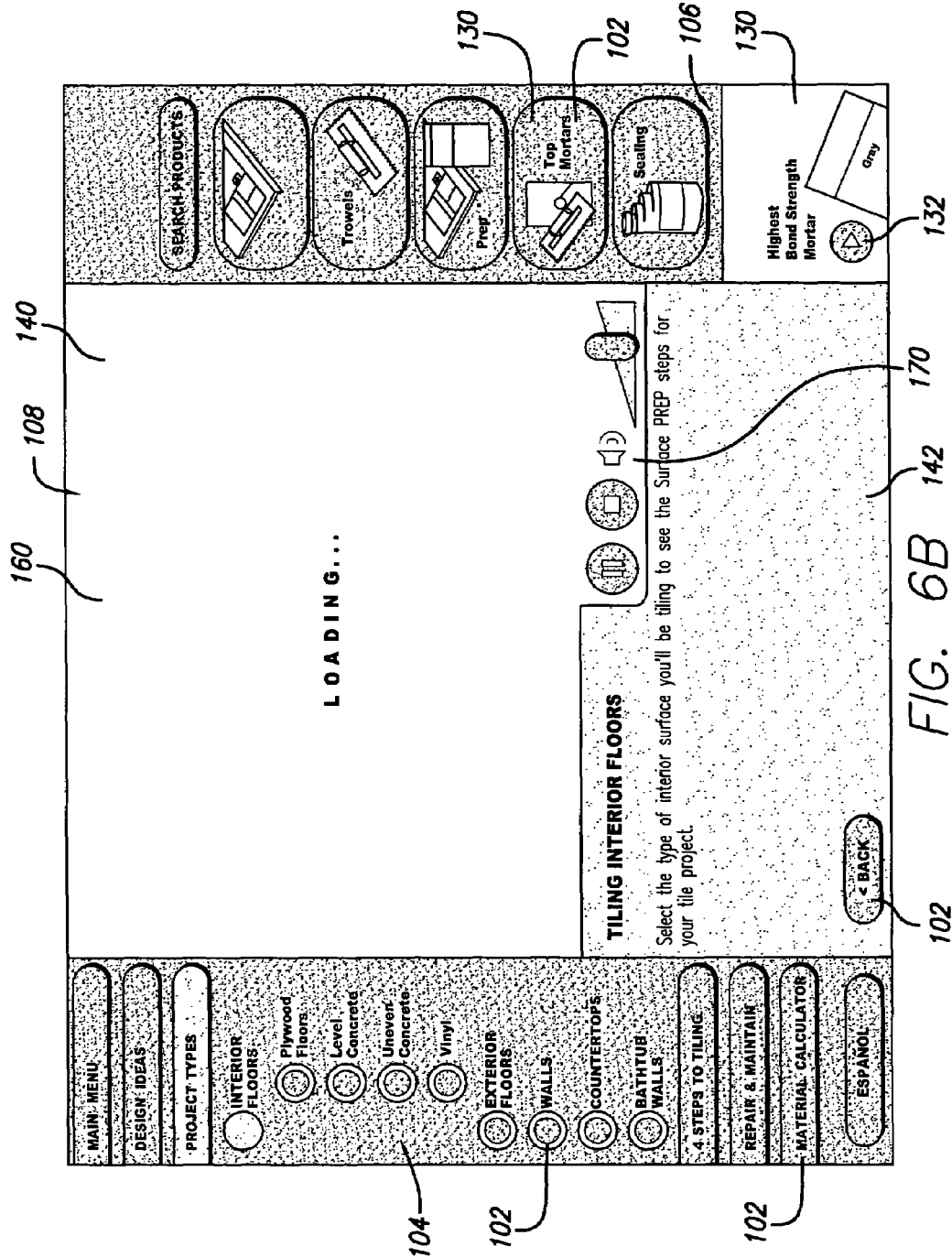
FIG. 6B is a perspective view of one embodiment of the interior floors screen displayed if the user elects to view information regarding interior floor projects from the project types screen illustrated in FIG. 6A.

Referring to FIGS. 6A and 6B, some of the screens that may be displayed when the user touches the "PROJECT TYPES" touch sensitive button 102 in the project selection area 104 of the interactive display 70 are illustrated. Upon touching the "PROJECT TYPES" button, the project types screen 210 is displayed as illustrated in FIG. 6A. The user is given the option of selecting which area he wishes to receive information about by touching the "INTERIOR FLOORS" button, the "EXTERIOR FLOORS" button, the "WALLS" button, the "COUNTERTOPS" button or the "BATHTUB WALLS" button.

If the user touches the "INTERIOR FLOORS" button on the project types screen 210, the interior floors screen 160 is displayed as illustrated in FIG. 6B. A video clip illustrating tiling projects on interior floors using products 80 available from the seller is presented in the information display area 108 and textual information in the textual depiction area 142 instructs the user to select the type of interior surface about which he or she desires to receive further information. Upon touching the "PLYWOOD FLOORS" button, the "LEVEL CONCRETE" button, the "UNEVEN CONCRETE" button or the "VINYL" button, the appropriate screen (not shown) is displayed and additional information regarding tiling projects for the selected surface using products available from the seller is presented in the information display area and textual depiction area.

If the user touches the "EXTERIOR FLOORS" button, the "WALLS" button, the "COUNTERTOPS" button or the "BATHTUB WALLS" button on the project types screen 210, a screen similar to the interior floors screen 160 is displayed. A video clip illustrating tiling projects in the selected area is presented and the user is instructed to select the type of surface in the selected area about which he or she desires to receive further information.

Figure 7:
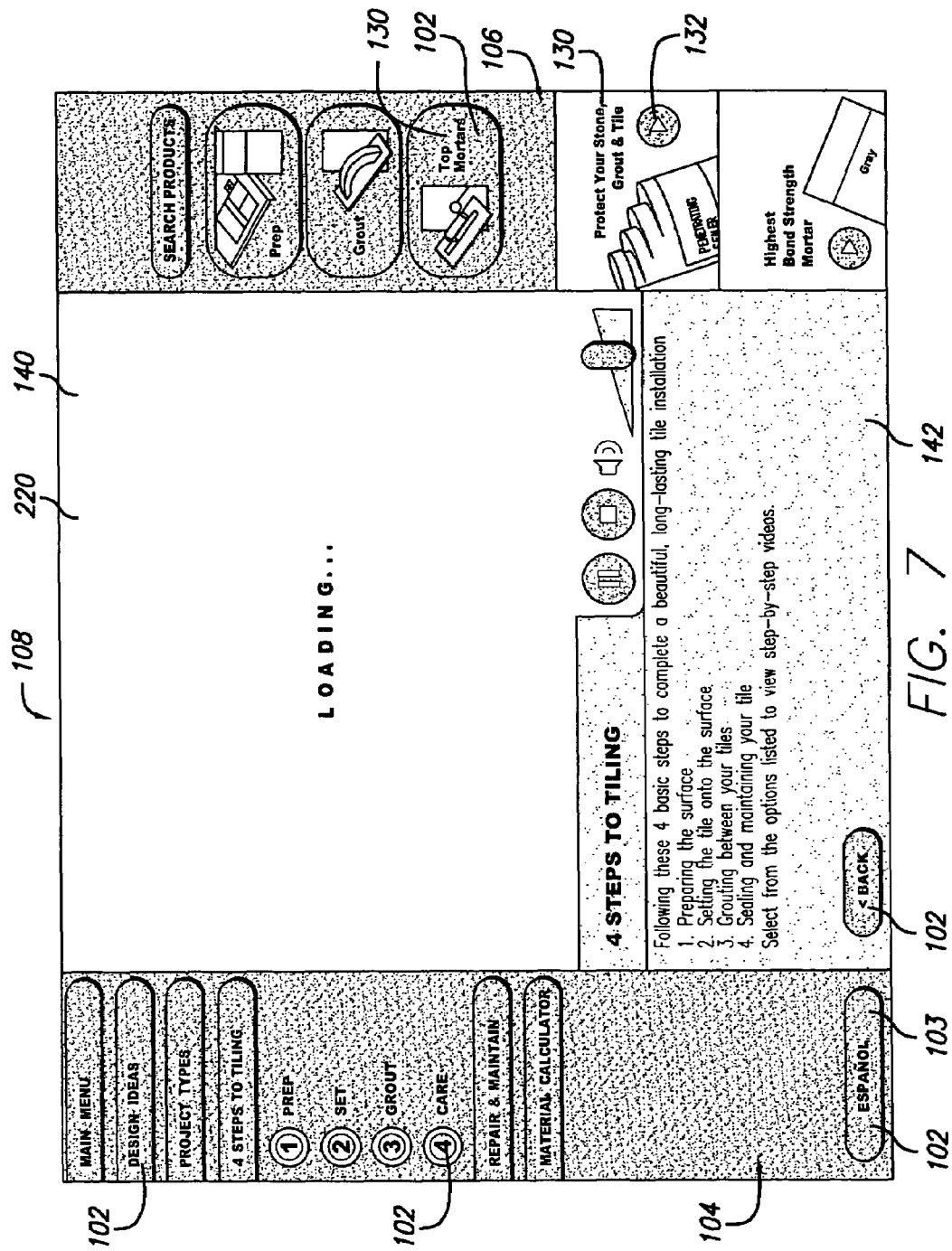
FIG. 7 is a perspective view of one embodiment of the tiling steps screen displayed by the interactive display of the present invention.

If the user touches the "4 STEPS TO TILING" button in the project selection area 104 of the interactive display 70, the tiling steps screen 220 is displayed as illustrated in FIG. 7. A video clip illustrating the various phases of a home improvement tiling project using products 80 available from the seller is presented in the information display area 108 and textual information in the textual depiction area 142 instructs the user to select the phase of a project about which he or she desires to receive step-by-step information. Upon touching the "PREP" button, the "SET" button, the "GROUT" button or the "CARE" button, the appropriate screen (not shown) is displayed and additional information regarding the step-by-step performance of the selected phase of a tiling project using products available from the seller is presented in the information display area and textual depiction area.

If the user touches the "REPAIR & MAINTAIN" button in the project selection area 104 of the interactive display 70, the repair and maintain screen 230 is displayed as illustrated in FIG. 8. A video clip illustrating the repair and maintenance of a home improvement tiling project using products 80 available from the seller is presented in the information display area 108 and textual information in the textual depiction area 142 instructs the user to select the type of tile about which he or she desires to receive additional repair and maintenance information. Upon touching the "TILE & GROUT" button or the "NATURAL STONE" button, the appropriate screen (not shown) is displayed and additional information regarding the repair and maintenance of the selected type of tile using products available from the seller is presented in the information display area and textual depiction area.

Figure 9A:
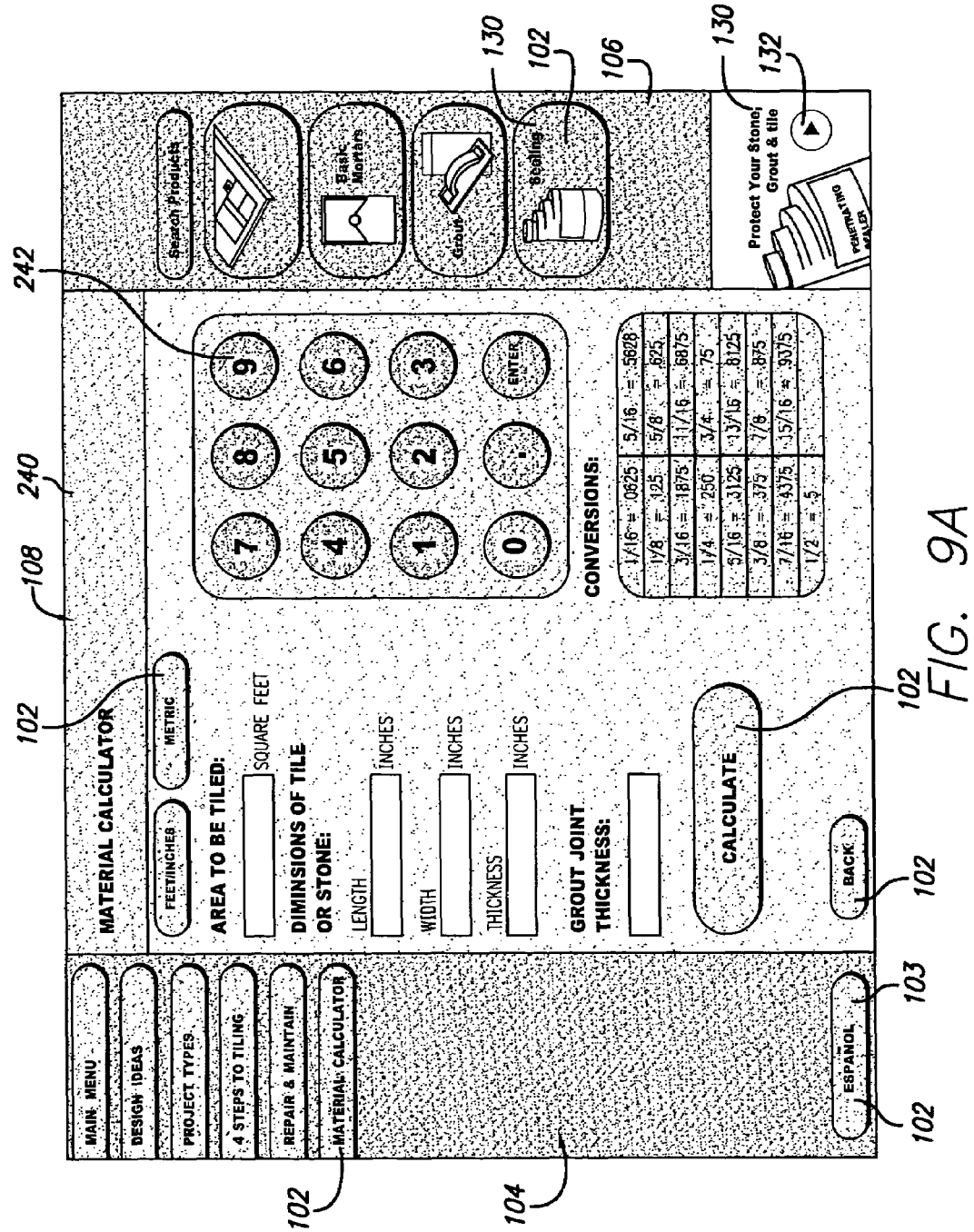
FIG. 9A is a perspective view of one embodiment of the material calculator screen of the present invention.
Figure 9B:
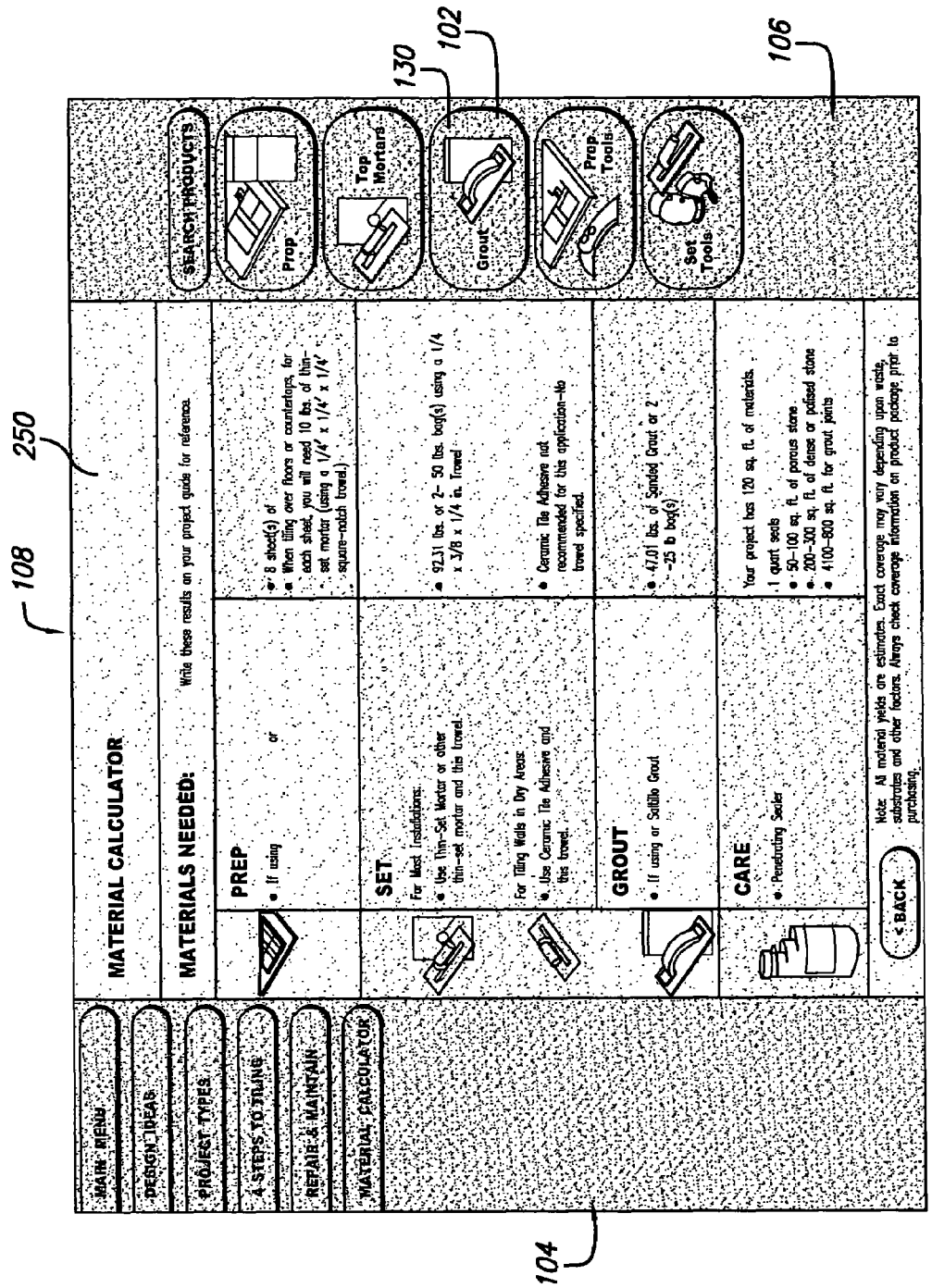
FIG. 9B is a perspective view of one embodiment of the materials display screen displayed after the user enters information regarding the parameters of the tiling project he wishes to perform on the material calculator screen illustrated in FIG. 9A.

Referring to FIGS. 9A and 9B, some of the screens that may be displayed when the user touches the "MATERIAL CALCULATOR" touch sensitive button 102 in the project selection area 104 of the interactive display 70 are illustrated. If the user touches the "MATERIAL CALCULATOR" button on the design ideas screen 150, the material calculator screen 240 is displayed as illustrated in FIG. 9A. Rather than visual and textual information, another interactive screen is displayed in the information display area 108.

The additional interactive screen displayed in the information display area 108 includes touch sensitive buttons 242 that allow the user to enter the parameters regarding the area to be tiled, the tile or stone to be used and the thickness of the grout joint desired. A touch sensitive "FEET/INCHES" button 102 and "METRIC" button as well as a conversion chart 244 may also be displayed to allow the entry of parameters in either format.

Once the user utilizes the buttons 242 to enter the applicable parameters in the "AREA TO BE TILED" window, the "LENGTH," "WIDTH," and "THICKNESS" windows for the tile or stone to be used, and the "GROUT JOINT THICKNESS" window, the materials display window 250 will be displayed as illustrated in FIG. 9B. The information display area 108 of the materials display window contains information regarding the estimated quantities of the seller's products that would be required for the phases of the tiling project (PREP, SET, GROUT, CARE).

It is contemplated that the number and type of screens displayed by the interactive display 70 as well as the information conveyed on the screens may be altered to accommodate additional features or to adapt the system for a different home improvement project. It is further contemplated that a "PRINT" button (not shown) may be provided on one or more of the screens to enable a user to obtain a hardcopy of the information displayed on the various screens from a printer 60 provided either in the enclosure 74 in which the interactive display is located or elsewhere in the retail store.

It is further contemplated that the screens of the interactive display 70 may be accessed from a remote server 77 over the Internet from a home computer 75, thereby allowing users to obtain information from home and to go to the retail store to buy the seller's products 80. The remote server 77 may be located in a central location, thereby linking the interactive displays in more than one retail store or the server may be located inside a particular store.

Moreover, it is contemplated that information regarding the use of the interactive display may be archived. This archival information, for example a history of accumulated use of the interactive display by users, would not be available to users of the system, but could be accessed by those persons with the proper "right to access" in order to facilitate "fine tuning" of the interactive display according to how users have accessed the system in the past.

By accessing the various screens available on the interactive display 70, a user may be educated not only regarding a particular home improvement project, but also in the products 80 available from a seller that are adapted to perform the project. As a user views the various screens on the interactive display, he or she is acclimated to the "look and feel" of the identifying indicia 82 of the seller's products as well as learning the benefits of those products. A user may be more likely to purchase the seller's products about which he or she is already knowledgeable and which products are conveniently located and easily identifiable on the shelves of the retail store in close proximity to the interactive display.

By providing a user-friendly interactive display 70 and arrangement of the seller's products 80 on the shelves of the retail store, the system of the present invention may cater to a range of users. The system may appeal to the "novice" user, a user who has some knowledge about a particular home improvement project, as well as the "expert" user who has specific needs regarding a particular home improvement or commercial construction project.

A user who is unsure of his or her ability to undertake a particular home improvement project may be encouraged to undertake the project. A "novice" user may feel comfortable learning about the home improvement or commercial construction project in an environment that allows him or her to learn at a comfortable pace without having to approach in-store personnel. Such a user may be more likely to purchase the seller's products 80 out of loyalty encouraged by ease with which information was accessed from the interactive display 70 and the ease with which the seller's products may be identified on the shelves of the adjacent bays 60 as well as the acclimation to the seller's products through the coordination of the information conveyed by the screens of the interactive display 70 and the identifying indicia 82 of the products.

At the same time, a user who is not a "novice" and who has already decided to undertake a particular home improvement project, may appreciate the ease with which he or she may view only the information that is desired without having to view unwanted information. Such a user may be more likely to purchase the seller's products 80 out of the same loyalty encouraged in the "novice" user.

Moreover, an "expert" user such as a contractor purchasing materials for a home improvement or commercial construction project may prefer the "one-stop shopping" facilitated by the arrangement of the seller's products 80 on the shelves of the bays 60 in the retail store as well as the ability to easily estimate the quantities of the seller's products needed for the performance of the project. Such a user may be more likely to purchase the seller's products 80 due to the ease with which the seller's products may be identified on the shelves of the adjacent bays 60 as well as a desire to purchase only the necessary quantities of products he needs in order to avoid excess quantities that may go to waste. The interactive display and expert information system can also be used to train store personnel and staff, by organized lessons or interactive training, to allow store personnel and staff to provide improved customer assistance.

The present invention also relates to a method for providing a visual display of a seller's products in a home improvement or commercial construction retail store utilizing the system described herein. An interactive display of the type described herein and the seller's products adapted to perform the various phases of a home improvement or commercial construction project are located, preferably in close proximity to each other, in the home improvement or commercial construction retail store.

The interactive display is adapted to disseminate information to a customer regarding the home improvement or commercial construction project. The customer may select the type of information disseminated by making selections on a keyboard, keypad or touch-sensitive screen. The interactive display allows the customer to select information ranging from general information about the home improvement project to specific information regarding phases of the project and the seller's products adapted to perform the project.

The interactive display is adapted to allow a customer to easily maneuver between various display screens without having to follow any particular sequence. The information disseminated may be in the form of textual information or visual information or a combination thereof and the information disseminated incorporates the "look and feel" of the seller's products in order to acclimate the customer to those products as he or she is educated about the home improvement or commercial construction project.

The seller's products are grouped on the shelves of the store according to the corresponding phase of the project for which they are adapted. Identifying indicia that permits a customer to easily identify the phase of the project for which the product is adapted as well as distinguishing the seller's products from those of other sellers are coordinated between the information disseminated by the interactive display and the seller's products such that selection of the seller's products by the customer is facilitated.

Optionally, the information disseminated by the interactive display may incorporate information regarding services provided by the home improvement or commercial construction retail store, for example design or contractor services related to the performance of the various phases of the home improvement project. By incorporating information regarding the services provided by the retail store, the retail store may be encouraged to incorporate the system into the store and have in-store personnel direct customers to use the system, thereby providing a synergistic relationship between the retail store, the seller and customers.

It will be apparent from the foregoing that, while particular forms of the invention have been illustrated and described, various modifications can be made without departing from the spirit and scope of the invention. Accordingly, it is not intended that the invention be limited, except as by the appended claims.

We claim:

1. A method of providing a visual display of a seller's products in a home improvement or commercial construction store, comprising:
   providing an interactive display for disseminating information in response to requests by a user, the information including information regarding a home improvement or commercial construction project and information regarding the seller's products adapted for use in performing the project, wherein the home improvement or commercial construction project is installing tile or stone and the phases of the home improvement or commercial construction project include preparing the area, setting the tile or stone, grouting the tile or stone and maintaining the installed tile or stone; and
   providing the seller's products adapted for use in performing the project, the products grouped on a plurality of shelves of the store according to the use for which the products are adapted and having indicia for identifying the seller's products;
   whereby the information disseminated by the interactive display is coordinated with the grouping of the seller's products on the shelves of the store and the indicia to facilitate selection and use of the seller's products for performing the project.

2. The method of claim 1, further comprising providing the seller's products adapted to perform all phases of the home improvement or commercial construction project from inception to completion.

3. The method of claim 1, further comprising providing a kiosk in which the interactive display is located.

4. The method of claim 3, further comprising providing some of the seller's products in the kiosk.

5. The method of claim 3, further comprising providing printed material in the kiosk, the printed material having the same indicia as the seller's products and conveying information regarding the home improvement project and information regarding the seller's products adapted for use in performing the project.

6. The method of claim 1, further comprising providing a hardcopy of the information disseminated by the interactive display.

7. The method of claim 1, wherein the information disseminated includes a description of tools and products provided by the seller and adapted for performing specific phases of the project.

8. The method of claim 1, further comprising providing an estimate of quantities of particular ones of the seller's products that are needed for performing a specific phase of the project based on information provided by the user.

9. The method of claim 1, wherein the information disseminated includes instructional presentations regarding how to perform a specific phase of the project.

10. The method of claim 1, further comprising providing access to the interactive display via a home computer accessed via the Internet.

11. The method of claim 1, further comprising tracking usage of the interactive display.

12. The method of claim 1, wherein the seller's products are grouped on the shelves of the store according to the corresponding phase of the project for which the products are adapted.

13. The method of claim 1, further comprising color coding the seller's products.

14. The method of claim 1, further comprising number coding the seller's products.

15. The method of claim 1, further comprising coding the seller's products with visual representations such as shapes or designs.

16. The method of claim 1, wherein the information disseminated includes descriptions of tools and products provided by the seller and adapted for performing specific phases of the project for a specific type of tile or stone in a specific environment.

17. A method of providing a visual display of a seller's products in a home improvement or commercial construction retail store, comprising:

providing a kiosk in the retail store, the kiosk having an interactive display with a touch sensitive screen for disseminating information in response to requests by a user, the information provided in a language selected by the user and including instructional presentations regarding how to perform specific phases of a tile or stone home improvement or commercial construction project and information regarding the seller's products adapted for use in performing phases of the project, wherein the home improvement or commercial construction project is installing tile or stone and the phases of the home improvement or commercial construction project include preparing the area, setting the tile or stone, grouting the tile or stone and maintaining the installed tile or stone;

providing access to the interactive display via a home computer accessed via the Internet; and providing the seller's products adapted for use in performing all phases of the tile or stone project from inception to completion, the products grouped on a plurality of shelves of the retail store according to the corresponding phase of the project for which the seller's products are adapted and having indicia for identifying the seller's products with the corresponding phase of the project;

whereby the information disseminated by the interactive display is coordinated with the grouping of the seller's products on the shelves of the retail store and the indicia to facilitate selection and use of the seller's products for performing the project.

18. The method of claim 17, further comprising providing printed material in the kiosk, the printed material having the same indicia as the seller's products and conveying information regarding the tile or stone home improvement or commercial construction project and information regarding the seller's products adapted for use in performing the project.

19. The method of claim 17, further comprising providing an estimate of quantities of particular ones of the seller's products that are needed for performing a specific phase of the tile or stone project based upon information provided by the user.

20. A system for selling products in a home improvement or commercial construction store, comprising:

an interactive display for disseminating information in response to requests by a user, the information including information regarding phases of a project and information regarding the seller's products adapted for use in performing phases of the project, wherein the project is installing tile or stone and the phases of the project include preparing the area, setting the tile or stone, grouting the tile or stone and maintaining the installed tile or stone; and a visual display of the seller's products adapted for use in performing phases of the project, the products grouped on a plurality of shelves of the store according to the corresponding phase of the project for which the seller's products are adapted and having indicia for identifying the seller's products with the corresponding phase of the project;

wherein the information disseminated by the interactive display is coordinated with the grouping of the seller's products on the shelves of the store and the indicia to facilitate selection and use of the seller's products for performing the corresponding phases of the project.

21. The system of claim 20, wherein the information disseminated directs the user to the location of the seller's products on the shelves of the store.

22. The system of claim 20, wherein the interactive display comprises a keyboard or keypad.

23. The system of claim 20, wherein the interactive display comprises a touch sensitive screen.

24. The system of claim 20, wherein the interactive display is in a kiosk.

25. The system of claim 20, further comprising a printer.

26. The system of claim 20, wherein the interactive display provides selection of a language in which information is disseminated.

27. The system of claim 20, wherein the information disseminated includes both video and textual information.

28. The system of claim 20, wherein the information disseminated includes description of tools and products provided by the seller and adapted for performing specific phases of the project.

29. The system of claim 20, wherein the interactive display provides a means for estimating quantities of particular ones of the seller's products that are needed for performing a specific phase of the project based upon information provided by the user.

30. The system of claim 20, wherein the information disseminated includes instructional presentations regarding how to perform a specific phase of the project.

31. The system of claim 20, wherein the indicia comprises color coding the seller's products.

32. The system of claim 20, wherein the indicia comprises number coding the seller's products.

33. The system of claim 20, wherein the indicia comprises visual representations such as shapes or designs.

34. The system of claim 20, wherein the interactive display provides a means for tracking usage of the interactive display.

35. The system of claim 20, further comprising a remote server that provides access to the interactive display from a home computer accessed via the Internet.

36. The system of claim 20, wherein the information disseminated includes information regarding the types of tile and stone available and the products and tools required for performing the phases of the project for the different types of tile and stone.

37. The system of claim 20, wherein the information disseminated includes descriptions of tools and products provided by the seller and adapted for performing specific phases of the project for a specific type of tile or stone in a specific environment.

38. The system of claim 37 wherein the environment is indoors.

39. The system of claim 37, wherein the environment is outdoors.

40. A system for selling products in a home improvement or commercial construction retail store, comprising:

a kiosk having an interactive display for disseminating information in response to requests by a user on a touch sensitive screen, the kiosk located in the retail store and the information provided in a language selected by the user and including video and textual information regarding performing the phases of a tile or stone project and information regarding the seller's products adapted for use in performing phases of the project, wherein the phases of the project include preparing the area, setting the tile or stone, grouting the tile or stone and maintaining the installed tile or stone;

a printer that facilitates obtaining a copy of the information disseminated by the interactive display; and a visual display of the seller's products adapted for use in performing phases of the tile or stone project, the products grouped on a plurality of shelves of the retail store according to the corresponding phase of the project for which the seller's products are adapted and having indicia for identifying the seller's products with the corresponding phase of the project;

wherein the information disseminated by the interactive display is coordinated with the grouping of the seller's products on the shelves of the retail store and the indicia such that the customer is directed to the location of the seller's products on the shelves of the retail store.

41. The system of claim 40, wherein the interactive display provides a means for estimating quantities of particular ones of the seller's products that are needed for performing a specific phase of the tile or stone project based upon information provided by the user.

42. The system of claim 40, wherein the information disseminated includes information regarding the types of tile and stone available and the products and tools required for performing the phases of the project for the different types of tile and stone.

43. The system of claim 40, wherein the information disseminated includes descriptions of tools and products provided by the seller and adapted for performing specific phases of the project for a specific type of tile or stone in a specific environment.

* * * * *